US010615908B2

(12) United States Patent
Wu (10) Patent No.: US 10,615,908 B2
(45) Date of Patent: Apr. 7, 2020

(54) DEVICE AND METHOD OF PERFORMING A CODEC RATE ADAPTATION IN A WIRELESS COMMUNICATION SYSTEM (71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/421,487

(22) Filed: May 24, 2019

(65) Prior Publication Data
US 2019/0280805 A1 Sep. 12, 2019

Related U.S. Application Data (62) Division of application No. 15/721,680, filed on Sep. 29, 2017.
(Continued)

(51) Int. Cl.
H04L 1/00 (2006.01)
H04W 36/00 (2009.01)
H04W 36/36 (2009.01)

(52) U.S. Cl.
CPC .......... H04L 1/0014 (2013.01); H04L 1/0026 (2013.01); H04W 36/00 (2013.01); H04W 36/005 (2013.01); H04W 36/36 (2013.01)

(58) Field of Classification Search
CPC .................................................... H04L 1/0026
See application file for complete search history.

(56) References Cited

U.S. PATENT DOCUMENTS 8,837,285 B2 * 9/2014 Sammour ............. H04W 36/02
370/230.1
2009/0219951 A1 * 9/2009 Chun ...................... H04W 8/26
370/474
(Continued)

FOREIGN PATENT DOCUMENTS

EP 2663139 A1 11/2013
EP 2854444 A1 4/2015
(Continued)

OTHER PUBLICATIONS

3GPP TSG-RAN2 Meeting #97, R2-1702415, Athens, Greece, Feb. 13-17, 2017.
(Continued)

Primary Examiner — Redentor Pasia
(74) Attorney, Agent, or Firm — Winston Hsu (57) ABSTRACT A communication device for performing a codec rate adaptation comprises at least one storage device for storing instructions and at least one processing circuit coupled to the at least one storage device. The at least one processing circuit is configured to execute the instructions stored in the at least one storage device. The instructions comprise triggering a first transmission of a first MAC CE for a bit rate query or a delay budget reporting, and a second transmission of a data; making a first determination that a transmission priority of the first MAC CE is lower than a transmission priority of the data; allocating the data in a MAC PDU in response to the first determination; and allocating the first MAC CE in the MAC PDU, if a remaining space in the MAC PDU is sufficient for allocating the first MAC CE after allocating the data.

4 Claims, 6 Drawing Sheets

Related U.S. Application Data (60) Provisional application No. 62/429,088, filed on Dec. 2, 2016, provisional application No. 62/405,261, filed on Oct. 7, 2016.

(56) References Cited

U.S. PATENT DOCUMENTS

| | | | |
|---|---|---|---|
| 2009/0316637 A1* | 12/2009 | Yi | H04W 72/10 |
| | | | 370/329 |
| 2010/0255850 A1* | 10/2010 | Kaukoranta | H04W 72/1268 |
| | | | 455/450 |
| 2010/0281486 A1* | 11/2010 | Lu | H04W 72/1247 |
| | | | 718/104 |
| 2010/0285803 A1 | 11/2010 | Persson | |
| 2010/0309788 A1* | 12/2010 | Ho | H04L 47/10 |
| | | | 370/236 |
| 2014/0067405 A1 | 3/2014 | Patel | |
| 2015/0092575 A1 | 4/2015 | Khay-Ibbat | |
| 2016/0119384 A1 | 4/2016 | Karimli | |
| 2019/0159071 A1* | 5/2019 | Yavuz | H04L 65/80 |

FOREIGN PATENT DOCUMENTS

| | | |
|---|---|---|
| WO | 2011/053222 A1 | 5/2011 |
| WO | 2015/141778 A1 | 9/2015 |

OTHER PUBLICATIONS

Search Report dated Nov. 17, 2017 for EP application No. 17195104.9, pp. 1-20.

3GPP TR 36.750 V14.0.0 (Sep. 2016), "3rd Generation Partnership Project; Technical Specification Group Radio Access Network; Evolved Universal Terrestrial Radio Access (E-UTRA); Study on Voice and Video enhancement for LTE (Release 14)", XP051161208, pp. 1-28.

Kyocera, "Details of RAN-assisted codec rate adaptation", 3GPP TSG-RAN WG2 #95bis, R2-166859, Oct. 10-14, 2016, Kaohsiung, Taiwan, XP051162274, pp. 1-6.

Search Report dated Feb. 22, 2018 for EP application No. 17195104.9, pp. 1-7.

Search Report dated Apr. 19, 2018 for EP application No. 18151907.5, pp. 1-7.

3GPP TS 36.321 V10.5.0 (Mar. 2012), "3rd Generation Partnership Project; Technical Specification Group Radio Access Network; Evolved Universal Terrestrial Radio Access (E-UTRA); Medium Access Control (MAC) protocol specification (Release 10)", XP050580263, pp. 1-54.

Intel Corporation, "Considerations on RAN-based codec mode/rate adaptation mechanism for VoLTE", 3GPP TSG-RAN WG2 Meeting #94, R2-163560, May 23-27, 2016, Nanjing, China, XP051105022, pp. 1-4.

Office action dated Aug. 23, 2018 for EP application No. 17195104.9, pp. 1-10.

Office action dated Mar. 7, 2019 for EP application No. 18151907.5, pp. 1-9.

Ericsson, "Codec rate adaptation", 3GPP TSG-RAN WG2 #94, Tdoc R2-164186, May 23-27, 2016, Nanjing, P.R. China, XP051105478, pp. 1-5.

Office action dated Jun. 27, 2019 for the U.S. Appl. No. 15/721,680, filed Sep. 29, 2017, p. 1-29.

* cited by examiner

DEVICE AND METHOD OF PERFORMING A CODEC RATE ADAPTATION IN A WIRELESS COMMUNICATION SYSTEM

CROSS REFERENCE TO RELATED APPLICATIONS

This is a division application of U.S. application Ser. No. 15/721,680, filed on Sep. 29, 2017, which claims the benefit of U.S. Provisional Application No. 62/405,261 filed on Oct. 7, 2016, and No. 62/429,088 filed on Dec. 2, 2016.

BACKGROUND OF THE INVENTION

1. Field of the Invention

The present invention relates to a device and a method used in a wireless communication system, and more particularly, to a device and a method of performing a codec rate adaptation in a wireless communication system.

2. Description of the Prior Art

Voice and Video over LTE (VoLTE/ViLTE) are key features for long-term evolution (LTE) to provide voice and video service. Regarding a codec mode/rate selection and adaptation in the VoLTE/ViLTE, third generation partnership project (3GPP) agrees that for the case of using the codec rate adaptation during an on-going call, from a radio access network (RAN) perspective, a RAN-assisted solution is beneficial and feasible.

SUMMARY OF THE INVENTION

The present invention therefore provides a communication device for performing a codec rate adaptation to solve the abovementioned problem.

A communication device for performing a codec rate adaptation comprises a storage device for storing instructions and a processing circuit coupled to the storage device. The processing circuit is configured to execute the instructions stored in the storage device. The instructions comprise triggering a first transmission of a first Medium Access Control (MAC) Control Element (CE) for a bit rate query or a delay budget reporting, and a second transmission of a data; making a first determination that a transmission priority of the first MAC CE is lower than a transmission priority of the data; allocating the data in a MAC Protocol Data Unit (PDU) in response to the first determination; and allocating the first MAC CE in the MAC PDU, if a remaining space in the MAC PDU is sufficient for allocating the first MAC CE after allocating the data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
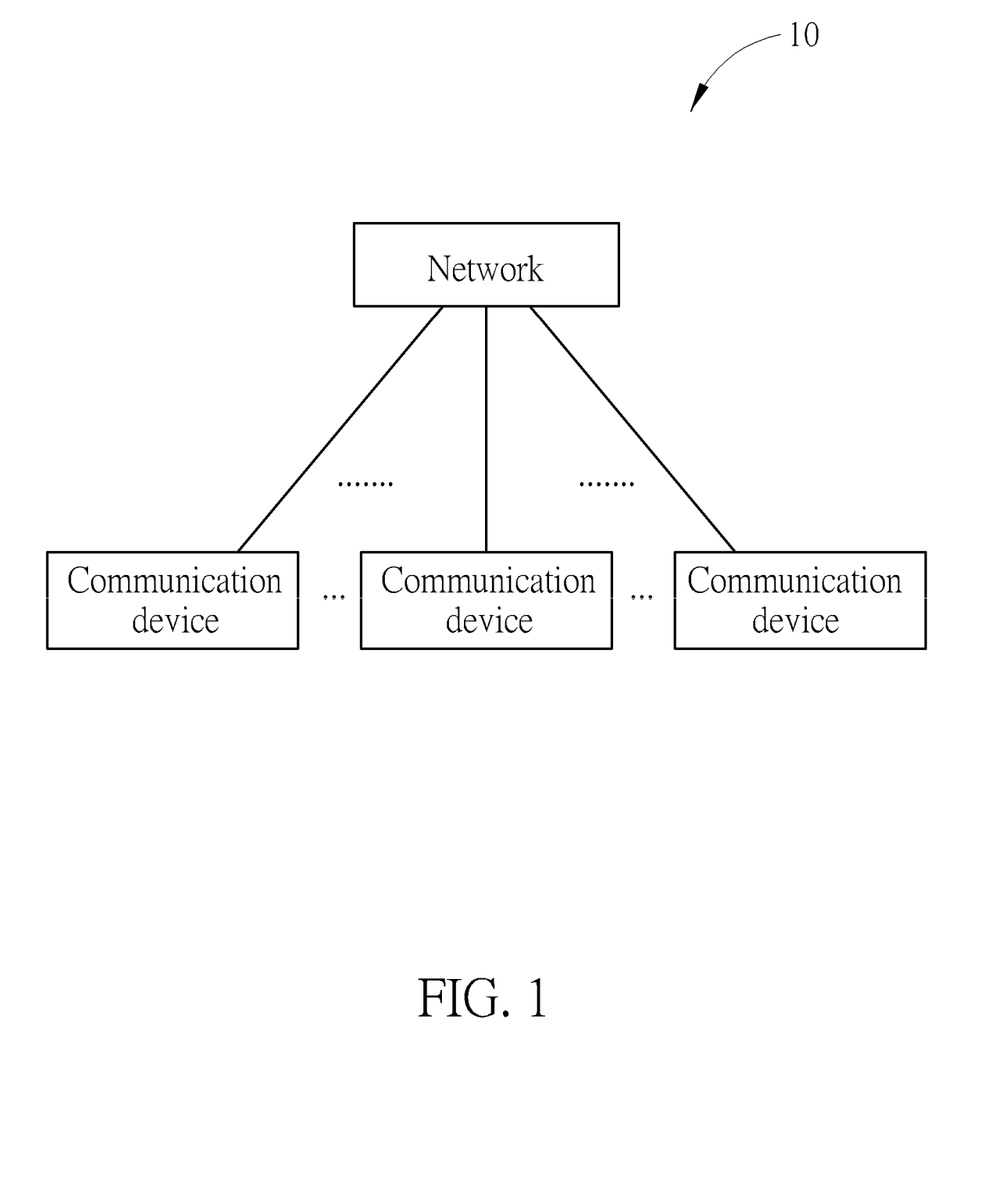
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers in the same or different duplexing modes (e.g., frequency-division duplexing (FDD), time-division duplexing (TDD) or flexible duplexing).

In FIG. 1, the network and the communication devices are simply utilized for illustrating the structure of the wireless communication system 10. The network may be an evolved Universal Terrestrial Radio Access Network (E-UTRAN) comprising at least one evolved Node-B (eNB) or a fifth generation (5G) radio access network comprising at least one 5G BS. The 5G radio communication technology may employ orthogonal frequency-division multiplexing (OFDM) or non-OFDM, a wide bandwidth (e.g., 100 MHz) and a transmission time interval (TTI) smaller than 1 millisecond (ms) (e.g., 100 or 200 us) for communicating between with the communication devices and the BS.

A communication device may be a UE, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
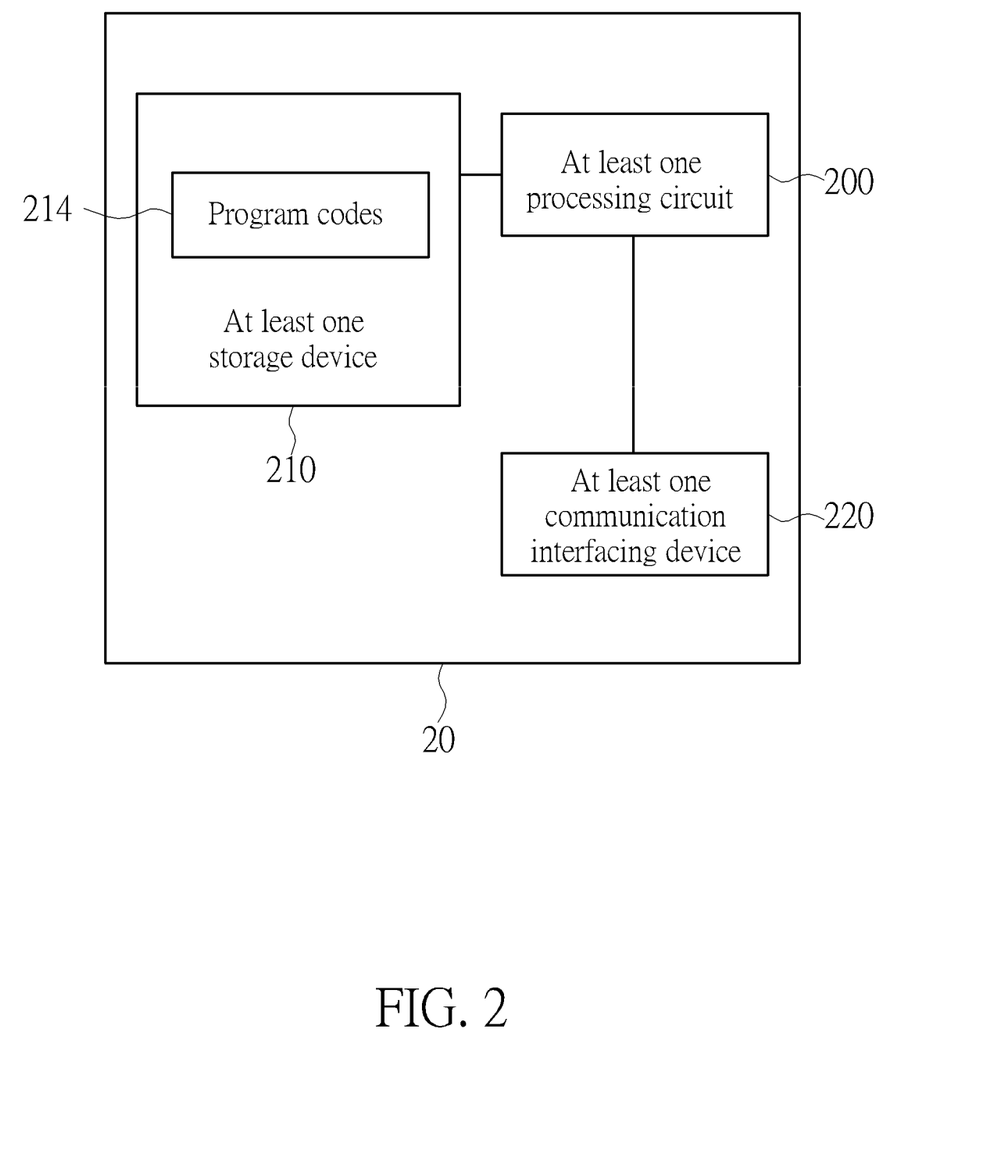
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver transmitting and receiving signals (e.g., data, messages and/or packets) according to processing results of the at least one processing circuit 200.

In the following embodiments, a UE is used to represent a communication device in FIG. 1, to simplify the illustration of the embodiments.

A radio access network (RAN)-involved codec adaptation solution enables an eNB to transmit a UL or DL codec adaptation indication with an explicitly recommended bitrate information to help a UE to select or adapt a proper codec rate for a voice over long term evolution/5G (LTE/5G) (VoLTE/5G) or video over LTE/5G (ViLTE/5G). In one example, when an eNB determines to recommend the UE in a RRC CONNECTED mode to modify a bit rate due to a poor radio condition or a network congestion detected in the UL or the DL, the eNB may signal a bit rate recommendation indicating a recommended bit rate (or recommended codec rate) to the UE.

A scenario assumed according to an example of the present invention is stated as follows. A UE may receive and apply a bit rate recommendation (e.g., indicating a low codec rate) from a first BS. Then, the UE receives a handover command from the first BS, and performs a handover to a second BS according to the handover command. After performing the handover to the second BS, the UE keeps using the low codec rate. However, it is not beneficial to keep using the low codec rate, if the second BS is able to serve the UE with a codec rate higher than the low codec rate. In this situation, the UE is not able to have a better voice/video quality after performing the handover.

Figure 3:
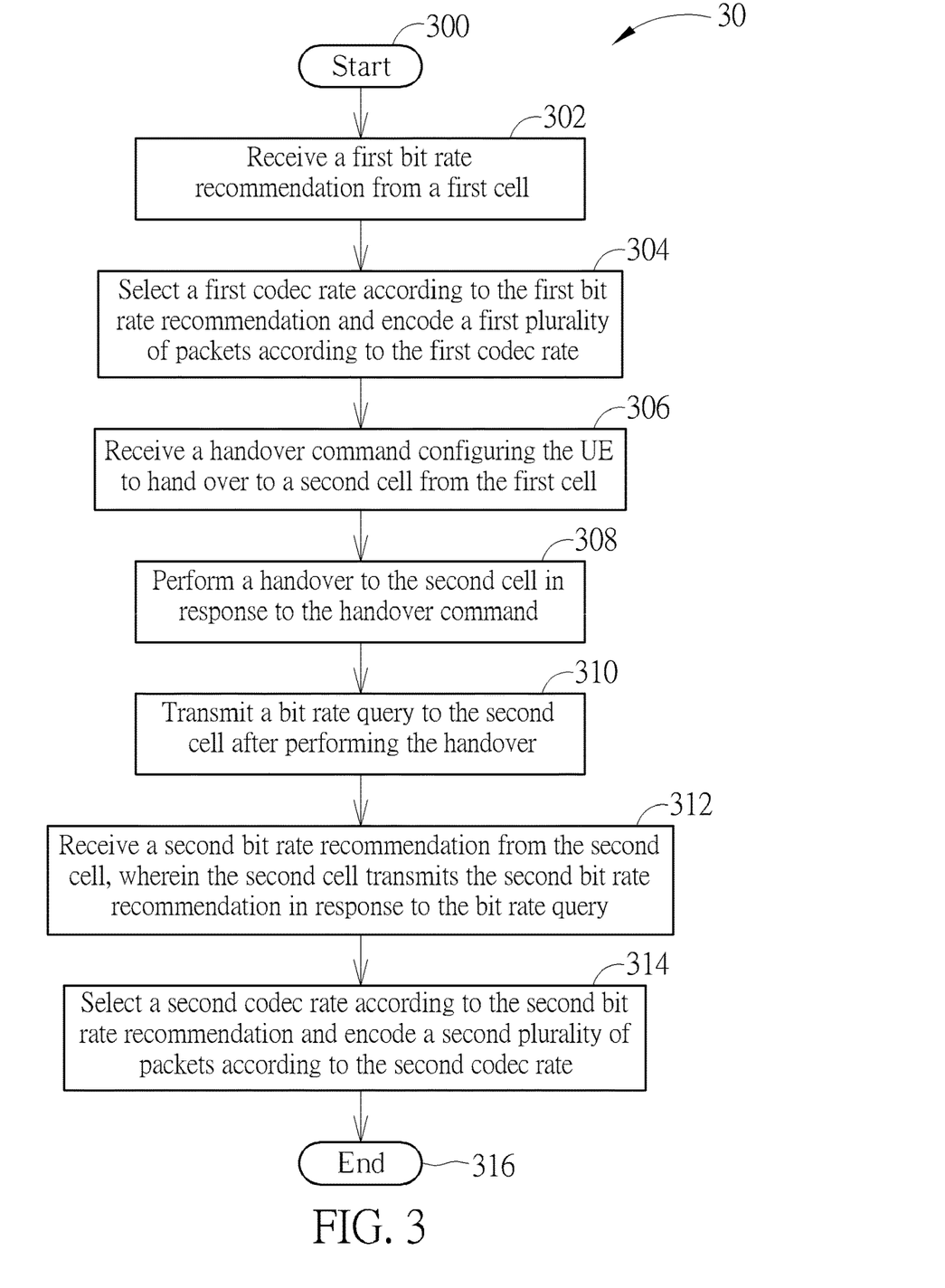
FIG. 3 is a flowchart of a process according to an example of the present invention.

FIG. 3 is a flowchart of a process 30 according to an example of the present invention. The process 30 can be utilized in a UE, for performing a codec rate adaptation. The process 30 includes the following steps:

Step 300: Start.

Step 302: Receive a first bit rate recommendation from a first cell.

Step 304: Select a first codec rate according to the first bit rate recommendation and encode a first plurality of packets according to the first codec rate.

Step 306: Receive a handover command configuring the UE to hand over to a second cell from the first cell.

Step 308: Perform a handover to the second cell in response to the handover command.

Step 310: Transmit a bit rate query to the second cell after performing the handover.

Step 312: Receive a second bit rate recommendation from the second cell, wherein the second cell transmits the second bit rate recommendation in response to the bit rate query.

Step 314: Select a second codec rate according to the second bit rate recommendation and encode a second plurality of packets according to the second codec rate.

Step 316: End.

According to the process 30, the UE selects (or determines) a second codec rate according to the second bit rate recommendation and encodes a second plurality of packets according to the second codec rate after the handover. That is, if the second cell can serve a codec rate higher than the first codec rate, the UE may not keep using the first codec rate after performing the handover. The UE may select the second codec rate, and encode the second plurality of packets more efficiently.

Realization of the process 30 is not limited to the above description. The following examples may be applied to the process 30.

In one example of the step 310, the UE transmits the bit rate query to the second cell, when the handover command configures the codec rate adaptation. The UE does not transmit the bit rate query to the second cell, when the handover command does not configure the codec rate adaptation (e.g., the second cell does not support the codec rate adaptation, so the second cell does not transmit the bit rate recommendation). In this case, the UE may change the codec rate according to its determination, after (or when) performing the handover (or in response to the handover). In one example, the UE may determine to increase the first codec rate without receiving the second bit rate recommendation, after (or when) performing the handover (or in response to the handover) in order to obtain a better voice/video quality (e.g., when a channel quality indicator or a signal strength/quality of the second cell is good (e.g., above a threshold)).

A scenario assumed according to an example of the present invention is stated as follows. A UE may receive and apply a bit rate recommendation (e.g., indicating a low codec rate) from a first cell. Then, the UE performs a Radio Resource Control (RRC) connection reestablishment procedure due to a detection of a radio link failure. The UE reestablishes a connection to a second cell. After the RRC connection reestablishment procedure, the UE keeps using the low codec rate. However, it is not beneficial to keep using the low codec rate if the second cell is able to serve the UE with a codec rate higher than the low codec rate. The UE is not able to have a better voice/video quality after the RRC connection reestablishment procedure.

Figure 4:
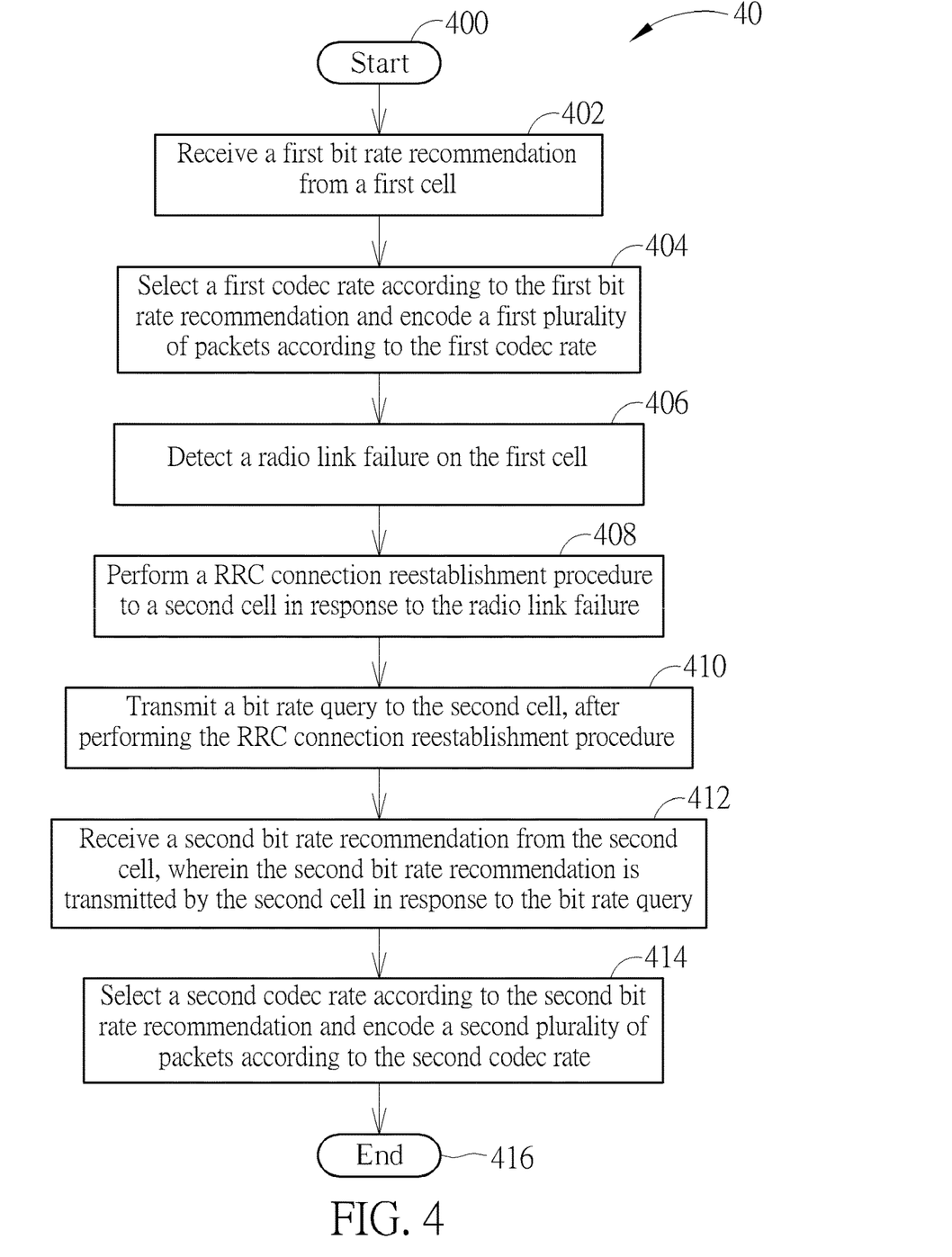
FIG. 4 is a flowchart of a process according to an example of the present invention.

FIG. 4 is a flowchart of a process 40 according to an example of the present invention. The process 40 can be utilized in a UE, for performing a codec rate adaptation. The process 40 includes the following steps:

Step 400: Start.

Step 402: Receive a first bit rate recommendation from a first cell.

Step 404: Select a first codec rate according to the first bit rate recommendation and encode a first plurality of packets according to the first codec rate.

Step 406: Detect a radio link failure on the first cell.

Step 408: Perform a RRC connection reestablishment procedure to a second cell in response to the radio link failure.

Step 410: Transmit a bit rate query to the second cell, after performing the RRC connection reestablishment procedure.

Step 412: Receive a second bit rate recommendation from the second cell, wherein the second bit rate recommendation is transmitted by the second cell in response to the bit rate query.

Step 414: Select a second codec rate according to the second bit rate recommendation and encode a second plurality of packets according to the second codec rate.

Step 416: End.

According to the process 40, if the second cell can serve a codec rate higher than the first codec rate, the UE may not keep using the first codec rate after (or when) performing the RRC connection reestablishment procedure (or in response to the RRC connection reestablishment procedure). The UE may select the second codec rate, and encode the second plurality of packet more efficiently.

Realization of the process 40 is not limited to the above description. The following examples may be applied to the process 40.

In one example of the step 410, the UE transmits the bit rate query to the second cell, when receiving a RRC message (e.g., RRCConnectionReconfiguration) following the RRC connection reestablishment procedure. The RRC message configures the codec rate adaptation. The UE does not transmit the bit rate query to the second cell, when the RRC message does not configure the codec rate adaptation. In this case, the UE changes the codec rate according to its determination, after (or when) performing the RRC connection reestablishment procedure (or in response to the RRC connection reestablishment procedure). In one example, the UE determines to increase the first codec rate without receiving the second bit rate recommendation after the RRC connection reestablishment procedure in order to obtain a better voice/video quality (e.g., when a channel quality indicator or a signal strength/quality of the second cell is good (e.g., above a threshold)).

In one example of the step 410, the UE transmits the bit rate query to the second cell, when receiving a RRCConnectionReestablishment message of the RRC connection reestablishment procedure. The RRCConnectionReestablishment message configures the codec rate adaptation. The UE does not transmit the bit rate query to the second cell, when the RRCConnectionReestablishment message does not configure the codec rate adaptation. In this case, the UE changes the codec rate according to its determination, after the RRC connection reestablishment procedure.

The following examples may be applied to the processes 30 and 40.

A BS may transmit the second bit rate recommendation in/via the second cell in response to the handover or the RRC connection reestablishment procedure without receiving the bit rate query. The UE may not need to transmit the bit rate query during/after the handover or the RRC connection reestablishment procedure.

A scenario assumed according to an example of the present invention is stated as follows. A UE may frequently transmit the bit rate query to the network such that the network has to frequently respond the bit rate query, which causes a waste of radio resources.

Figure 5:
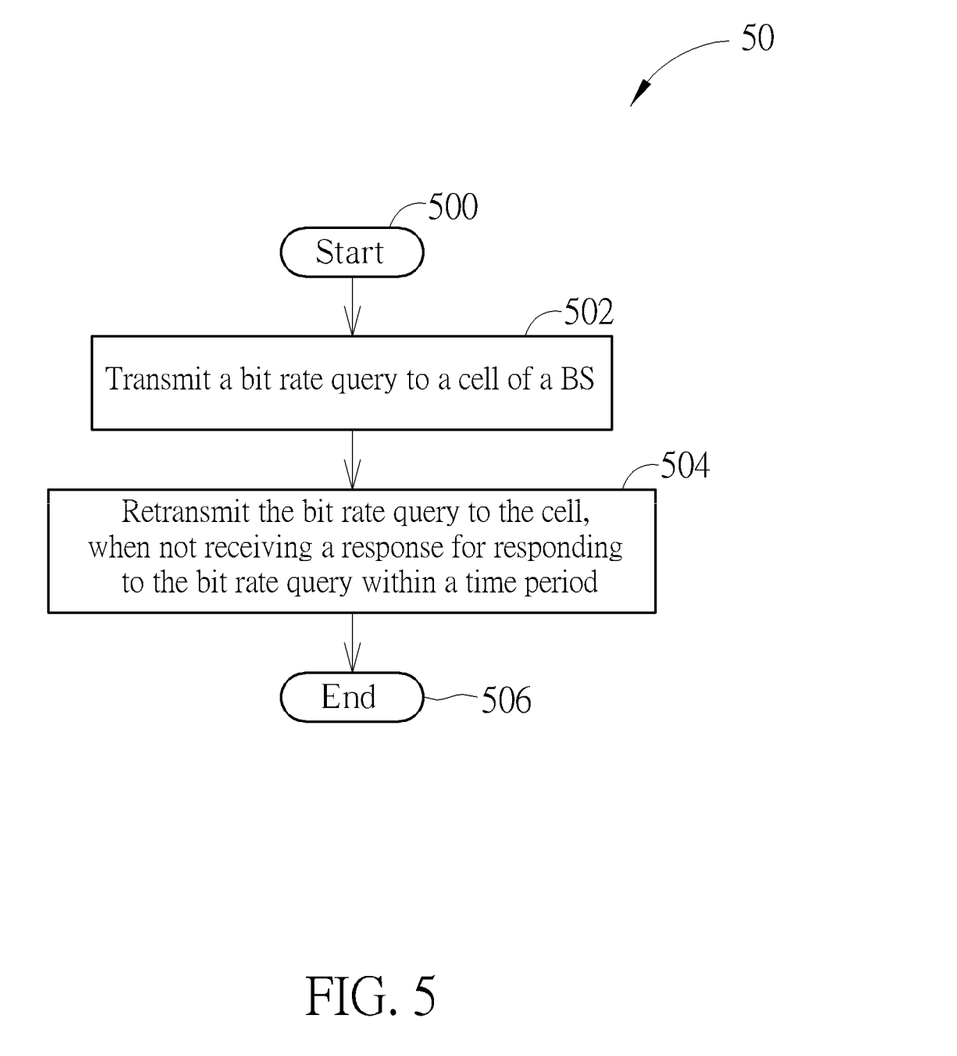
FIG. 5 is a flowchart of a process according to an example of the present invention.

FIG. 5 is a flowchart of a process 50 according to an example of the present invention. The process 50 can be utilized in a UE, for performing a codec rate adaptation. The process 50 includes the following steps:

Step 500: Start.

Step 502: Transmit a bit rate query to a cell of a BS.

Step 504: Retransmit the bit rate query to the cell, when not receiving a response for responding to the bit rate query within a time period.

Step 506: End.

According to the process 50, the UE does not frequently transmit the bit rate query to the network. The UE retransmits the bit query if the network does not respond to the bit rate query within the time period. Thus, the radio resources can be saved.

Realization of the process 50 is not limited to the above description. The following examples may be applied to the process 50.

In one example, the time period is configured by a network of the cell. In one example, the response is a bit rate recommendation or a reject response for rejecting the bit rate query for a recommended bit rate.

A scenario assumed according to an example of the present invention is stated as follows. When the UE is triggered to transmit a first Medium Access Control (MAC) Control Element (CE) for the bit rate query, the UE may also be triggered to transmit at least one second MAC CE. Or there may be data for the UE to transmit. If there is no sufficient resource to transmit all of the first MAC CE, the at least one second MAC CE and data, it is not known which one the UE should transmit first (i.e., the transmitting priorities of the first MAC CE, the second MAC CE and the data are unknown).

Figure 6:
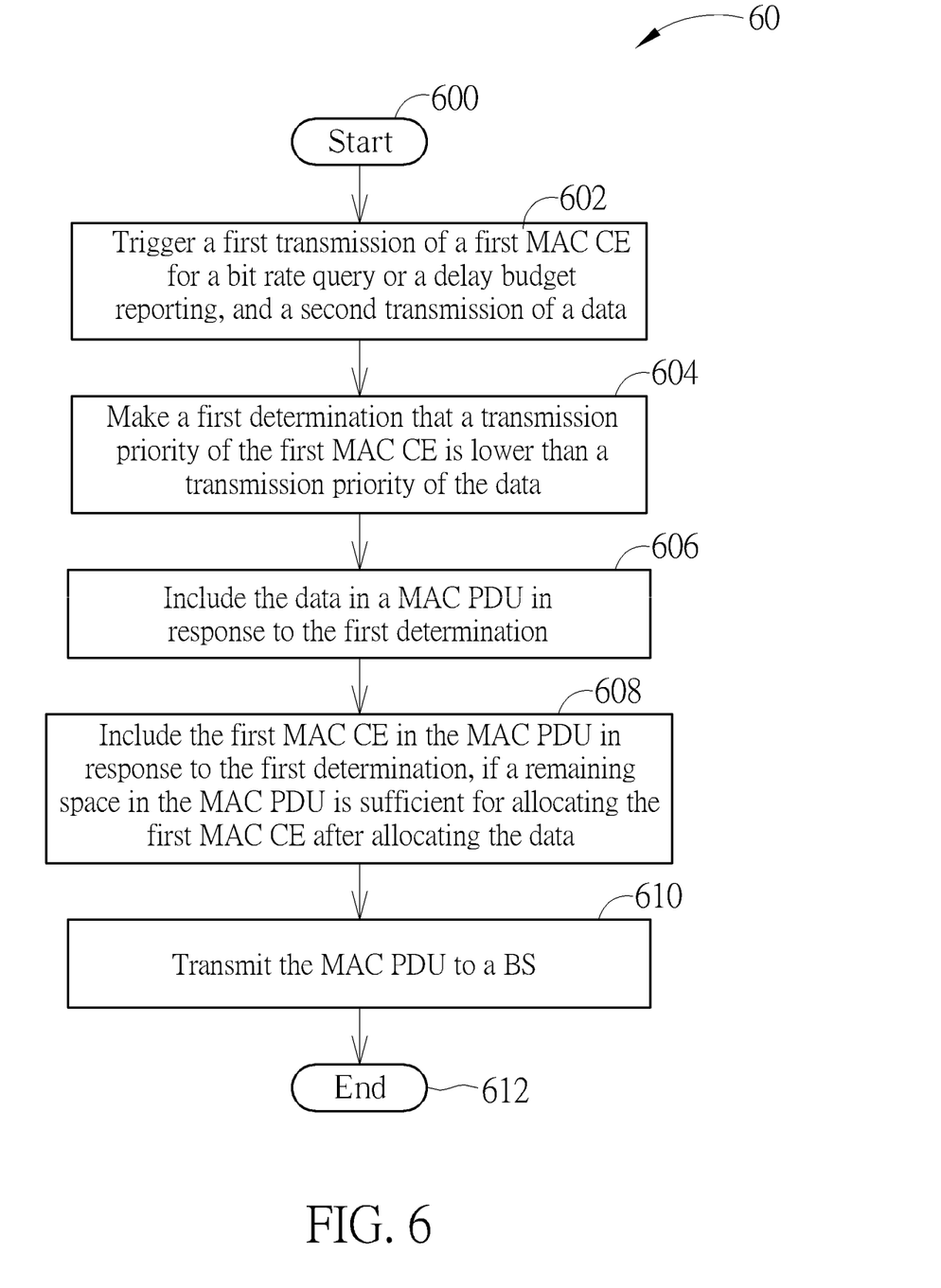
FIG. 6 is a flowchart of a process according to an example of the present invention.

FIG. 6 is a flowchart of a process 60 according to an example of the present invention. The process 60 can be utilized in a UE, for performing a codec rate adaptation. The process 60 includes the following steps:

Step 600: Start.

Step 602: Trigger a first transmission of a first MAC CE for a bit rate query or a delay budget reporting, and a second transmission of a data.

Step 604: Make a first determination that a transmission priority of the first MAC CE is lower than a transmission priority of the data.

Step 606: Include the data in a MAC Protocol Data Unit (PDU) in response to the first determination.

Step 608: Include the first MAC CE in the MAC PDU in response to the first determination, if a remaining space in the MAC PDU is sufficient for allocating the first MAC CE after allocating the data.

Step 610: Transmit the MAC PDU to a BS.

Step 612: End.

According to the process 60, the UE makes the determination of which one of the first MAC CE and the data should be transmitted first. According to the determination, the UE first includes (e.g., allocates) the data in the MAC PDU since the priority of the data is higher than that of the first MAC CE. The UE then includes the first MAC CE in the MAC PDU if (or when) there is sufficient remaining space in the MAC PDU.

Realization of the process 60 is not limited to the above description. The following examples may be applied to the process 60.

In one example, the UE triggers a third transmission of a second MAC CE (e.g., buffer status report MAC CE). Then, the UE makes a second determination that a transmission priority of the second MAC CE is higher than a transmission priority of the data. The UE includes the second MAC CE in the MAC PDU in response to the second determination. If a remaining space in the MAC PDU is sufficient for including the data after including the second MAC CE, the UE includes the data in the MAC PDU. If the remaining space in the MAC PDU is sufficient for including the first MAC CE after including the second MAC CE and the data, the UE including the first MAC CE in the MAC PDU.

In one example, the data is obtained by the UE from any logical channel except a UL common control channel (UL-CCCH).

When data is obtained from the UL-CCCH, the UE determines the data from the UL-CCCH has a higher priority than the second MAC CE. In response to the determination, the UE includes the data in the MAC PDU firstly, the second MAC CE secondly, and the first MAC CE lastly.

The following examples may be applied to the processes 30, 40, 50 and 60.

In one example, the first cell and the second cell belong to the same BS or different BSs (e.g., the first BS and the second BS) in the network. In one example, a codec of the first codec rate and the second codec rate is an Automatic Multi-Rate (AMR) codec, an AMR Wideband (AMR-WB) codec or an Enhanced Voice Services (EVS) codec. When the first codec rate is changed, the codec may or may not be changed.

In one example, the first plurality of packets and the second plurality of packets are voice packets belonging to a first voice call (e.g., Internet Protocol Multimedia Subsystem (IMS) voice call). In one example, the first plurality of packets and the second plurality of packets are IMS video packets belonging to a second video call (e.g., IMS video call). The UE transmits the encoded first plurality of packets and the encoded second plurality of packets to the second cell.

In one example, the bit rate query, the first bit rate recommendation and the second bit rate recommendation are MAC CEs. In one example, the bit query, the first rate recommendation and the second rate recommendation are RRC messages.

In one example, before the step 302, the step 402 or the step 502, the UE transmits a first RRC message including an indication indicating to a network (e.g., a BS) that the UE supports codec rate adaptation. Then, the UE receives a second RRC message which configures the UE to apply the codec rate adaptation from the network. The first cell of the network transmits the second RRC message in response to the first RRC message. The network transmits the second RRC message when the network knows the UE supports the codec rate adaptation, and the network configures a bearer which has Quality of Service (QoS) setting (e.g., QoS class identifier, QCI) for a voice call or a video call to the UE. The UE transmits the bit rate query, and processes the bit rate recommendation in the MAC CE in response to the second RRC message. The MAC layer of the UE does not apply the bit rate recommendation, when the UE does not receive the second RRC message. In one example, the first RRC message is a UECapabilityInformation message, and the second RRC message is a RRCConnectionReconfiguration message. In one example, if the UE is configured by the network more than one MAC entities, the UE applies the MAC entity which is responsible for transmitting the voice/video packets (e.g., the first plurality of packets and the second plurality of packets in the processes 30 and 40) to transmit the bit rate query and process the bit rate recommendation. In one example, the second RRC message specifically configures the codec rate adaptation to a specific MAC entity so the UE knows that the specific MAC entity is used to transmit the bit rate query and process the bit rate recommendation. That is, the codec rate adaptation configuration is associated to a MAC entity configuration.

In one example, the UE receives the codec rate adaptation configuration in a RRC connected state. The UE releases the codec rate adaptation configuration, when the UE enters the RRC idle state from the RRC connected state. The UE keeps the codec rate adaptation configuration, when the UE is configured by the network to suspend its RRC connection (called RRC suspended state) or when the UE is configured to enter a RRC lightly connected state (or called a RRC inactive state). Thus, the UE transmits the bit rate query and processes the bit rate recommendation, when the UE enters the RRC connected state from the RRC suspended state or from the RRC lightly connected state.

In one example, when a MAC CE is allocated, its corresponding subheader is also allocated. Thus, the UE considers whether the remaining space in the MAC PDU is sufficient for the MAC CE or not. The UE considers the remaining space is sufficient to allocate the MAC CE and the corresponding subheader.

Those skilled in the art should readily make combinations, modifications or alternations on the abovementioned description and examples. Any of the abovementioned description, steps or processes including suggested steps can be realized by means that could be hardware, software, firmware, an electronic system, or combination thereof. An example of the means may be the communication device 20. Any of the above processes and examples above may be compiled into the program code 214.

To sum up, the present invention provides a device and a method for a codec rate adaptation. The UE is able to select a codec rate that makes the process of codec more efficiently. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for performing a codec rate adaptation, comprising:
   at least one storage device; and
   at least one processing circuit, coupled to the at least one storage device, wherein the at least one storage device stores, and the at least one processing circuit is configured to execute instructions of:
   triggering a first transmission of a first Medium Access Control (MAC) Control Element (CE) for a bit rate query or a delay budget reporting, and a second transmission of a data;
   making a first determination that a transmission priority of the first MAC CE is lower than a transmission priority of the data;
   comprising the data in a MAC Protocol Data Unit (PDU) in response to the first determination;
   comprising the first MAC CE in the MAC PDU in response to the first determination, if a remaining space in the MAC PDU is sufficient for comprising the first MAC CE after comprising the data; and
   transmitting the MAC PDU to a base station (BS).

2. The communication device of claim 1, wherein the storage device further stores the instructions of:
   triggering a third transmission of a second MAC CE;
   making a second determination that a transmission priority of the second MAC CE is higher than a transmission priority of the data;
   comprising the second MAC CE in the MAC PDU in response to the second determination; and
   comprising the data in the MAC PDU, if a remaining space in the MAC PDU is sufficient for comprising the data after comprising the second MAC CE; and
   comprising the first MAC CE in the MAC PDU, if the remaining space in the MAC PDU is sufficient for comprising the first MAC CE after comprising the second MAC CE and the data.

3. A method for performing a codec rate adaptation for a communication device, comprising:
   triggering a first transmission of a first Medium Access Control (MAC) Control Element (CE) for a bit rate query or a delay budget reporting, and a second transmission of a data;
   making a first determination that a transmission priority of the first MAC CE is lower than a transmission priority of the data;
   comprising the data in a MAC Protocol Data Unit (PDU) in response to the first determination;
   comprising the first MAC CE in the MAC PDU in response to the first determination, if a remaining space in the MAC PDU is sufficient for comprising the first MAC CE after comprising the data; and
   transmitting the MAC PDU to a base station (BS).

4. The method of claim 3, further comprising:
   triggering a third transmission of a second MAC CE;
   making a second determination that a transmission priority of the second MAC CE is higher than a transmission priority of the data;
   comprising the second MAC CE in the MAC PDU in response to the second determination; and
   comprising the data in the MAC PDU, if a remaining space in the MAC PDU is sufficient for comprising the data after comprising the second MAC CE; and comprising the first MAC CE in the MAC PDU, if the remaining space in the MAC PDU is sufficient for comprising the first MAC CE after comprising the second MAC CE and the data.

* * * * *